Figures 1, 2, 3, 4, 5:
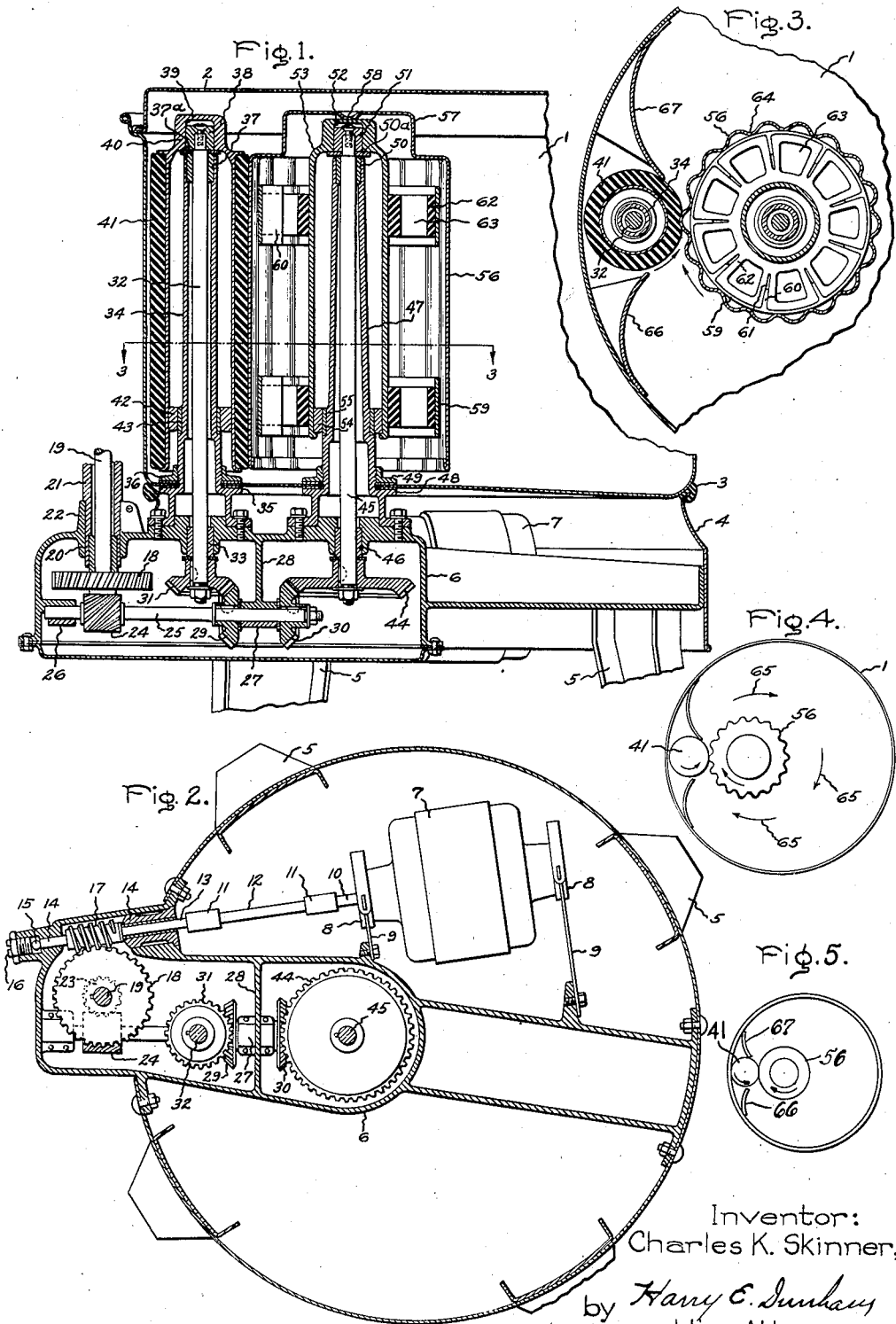

Jan. 14, 1941.  C. K. SKINNER  2,228,853
WASHING MACHINE
Filed Feb. 23, 1939

Inventor:
Charles K. Skinner,
by Harry E. Dunham
His Attorney.

Patented Jan. 14, 1941

2,228,853

UNITED STATES PATENT OFFICE 2,228,853

WASHING MACHINE

Charles K. Skinner, Southport, Conn., assignor to General Electric Company, a corporation of New York Application February 23, 1939, Serial No. 258,012

10 Claims. (Cl. 68—99)

The present invention relates to washing machines of the type in which the clothes are subjected to a squeezing or kneading action by rolls.

The object of my invention is to provide an improved construction and arrangement in washing machines of this type, and for a consideration of what I believe novel and my invention attention is directed to the following description and the claims appended thereto.

In the accompanying drawing, Fig. 1 is a sectional elevation of a washing machine embodying my invention; Fig. 2 is a sectional plan view of the driving mechanism; Fig. 3 is a sectional view taken on line 3—3 of Fig. 1; Fig. 4 is a diagrammatic top plan view of the washing machine, and Fig. 5 is a diagrammatic top plan view of a modification.

Referring to the drawing, there is shown a washing machine having a corrosion resistant sheet metal tub 1 provided with a cover 2 and resting on a rubber bead 3 on the upper edge of a cylindrical skirt 4 to which are attached supporting legs 5. Extending diametrically across the skirt and fixed at each end thereto is a gear case 6 on which an electric motor 7 is resiliently supported by rubber rings 8 clamped to supports 9 fixed to the gear case. The motor shaft 10 is connected by flexible couplings 11 and an intermediate shaft 12 to a worm shaft 13 journaled in bearings 14 in the gear case. The end thrust of the worm shaft is taken by a thrust ball 15 bearing against an adjustable plug 16 threaded in the gear casing. A worm 17 formed on the worm shaft meshes with a worm gear 18 keyed to the lower end of a vertical shaft 19 journaled in a bearing 20 in a wringer post 21 clamped in a boss 22 in the top wall of the gear casing. The shaft 19 is adapted to drive a wringer mounted in the customary manner on the upper end of the wringer post 21.

Keyed on the shaft 19 below the worm gear 18 is a pinion 23 meshing with a gear 24 fixed on a horizontal shaft 25 journaled respectively in a bearing 26 at the outer end of the gear casing and in a bearing 27 in a wall 28 extending across the side walls of the gear casing. On opposite sides of the bearing 27 are bevel gears 29 and 30 keyed to the shaft 25. The gear 29 meshes with a bevel gear 31 keyed to the lower end of a vertical shaft 32 extending upward within the outer part of the tub. The shaft 32 is journaled in a bearing 33 in the top wall of the gear casing and extends up through a tubular post 34 fixed to the top of the gear casing. The post 34 is provided with a flange 35 which engages the bottom wall of the tub and is clamped thereto by a nut 36 threaded on the post. The upper end of the post 34 extends slightly above the normal water level in the tub. The upper end of the shaft 32 is journaled therein in a bearing 37 and is supported on the upper end of the post 34 by a thrust washer 37a. Fixed to the upper end of the shaft 32 is a nut 38 which fits in a socket 39 in the hub 40 of a roll 41. The hub 40 has a cylindrical portion which depends around the post 34 and is guided thereon at its lower end by a bearing 43 on the post cooperating with a collar 42 fixed in the hub. The outer surface of the cylindrical portion of the hub is covered by a soft rubber coating.

The gear 30 meshes with a bevel gear 44 keyed to the lower end of a vertical shaft 45 extending upward within the central part of the tub. The shaft 45 is journaled in a bearing 46 in the top wall of the gear casing and extends up through a tubular post 47 fixed to the top of the gear casing. The post is provided with a flange 48 which engages the bottom of the tub and is clamped thereto by a nut 49 threaded on the post. At the upper end of the post 47, slightly above the water level in the tub, is fixed a bearing 50 for the shaft 45. The shaft is supported on the post 47 by a thrust washer 50a. On the upper end of the shaft 45 is fixed a nut 51 which fits in a socket 52 in a cylindrical hub 53 depending around the post 47. The lower end of the hub 53 has fixed therein a collar 54 which bears on a bearing 55 fixed to the post. Surrounding the hub 53 and engaging the roll 41 is a hollow conical or cylindrical metal shell or roll 56 having a dome 57 at its upper end extending over the hub. A projection 58 in the dome rests on the upper end of the hub and supports the shell thereon. The shell is resiliently connected to the hub 53 at its upper and lower ends by metal rings 59 fixed to the inner surface of the shell and having radial inwardly extending projections 60 fitting in grooves 61 in rubber rings 62. The inner surfaces of the ring 62 are fixed to the hub. The holes 63 are provided in the rings to increase the resilience thereof. The rubber rings 62 and associated parts provide yielding driving connection from the shaft 45 to the roll 56 which permits the roll to have a yielding movement in both torsional and radial directions. The ratios of the gears driving the shafts 32 and 45 are such that the rolls 41 and 56 are driven at substantially the same peripheral velocity. The roll 56 has vertical corrugations 64 which provide vanes inducing a circulation of the liquid and clothes in the tub in the direction of rotation of the roll.

In the use of the washing machine the tub is filled with liquid and clothes, and the rolls 41 and 56 are rotated in the direction of the arrows in Fig. 4. The corrugations on the outer surface of the roll 56 produce a circulation of the liquid and clothes in the direction of the arrows 65. This causes the clothes to be fed between the bite of the rolls and to be forcibly pulled through the rolls. While passing through the rolls the clothes are compressed by the pressure between the rolls squeezing liquid from the clothes and flexing the fibers thereof whereby the dirt is flushed from the interstices of the fabric. The squeezing action is accentuated by the fact that the roll 41 is of soft rubber and the surface thereof is accordingly pressed inward by the corrugations 64, as indicated in Fig. 3. Upon leaving the rolls, the clothes expand, the fibers again flexing, and liquid again being absorbed in the interstices of the fabric. The washing action is in effect an alternate compression and expansion of the fabric with the dirt being removed therefrom by the flexing of the fiber and the flushing action of liquid flowing into and out of the interstices of the fabric. A guiding vane 66 fixed to the side wall of the tub in front of the bite of the rolls guides the clothes thereto. Wrapping of the clothes around the roll 41 is prevented by a plate 67 fixed to the tub and engaging the roll 41 beyond the bite of the rolls. The plate 67 strips clothes from the roll 41. The circulatory movement of the clothes is effected partly as a result of the water currents set up by the corrugations 64, but is primarily effected by the forcible ejection of the clothes from between the rolls. Since the rolls rotate on a vertical axis, settling of the clothes toward the bottom of the tub does not affect the operation. The clothes continually circulate around the roll 56 and are repeatedly subjected to the squeezing action of the rolls. This assures uniform washing of all parts of the clothes. The yielding movement of the roll 56 which permits both a torsional and radial movement thereof limits the force exerted on the clothes and accordingly prevents damage due to bunching of the clothes between the rolls. The washing action is independent of the water level in the tub. For light loads, the tub need be only partially filled. If the liquid is drained from the tub the rolls may be used as a wringer. For this use it is preferable that the rolls have smooth surfaces as shown in Fig. 5. This eliminates the need for a separate wringer.

What I claim as new and desire to secure by Letters Patent of the United States is:

1. In a washer, a tub, a vertical roll in the central part of the tub, a cooperating vertical roll within the outer part of the tub, and means for rotating the rolls whereby the clothes are fed between the bite of the rolls and circulated around the tub and back to the bite of the rolls.

2. In a washer, a tub, a vertical roll in the central part of the tub, a cooperating vertical roll within the outer part of the tub, guides at the outside of the tub for directing clothes to the bite of the rolls, and means for rotating the rolls whereby the clothes are fed between the bite of the rolls and circulated around the tub and back to the bite of the rolls.

3. In a washer, a tub, a vertical roll in the central part of the tub, a cooperating vertical roll within the outer part of the tub, means for rotating the rolls whereby the clothes are fed between the bite of the rolls and circulated around the tub and back to the bite of the rolls, and stripping means engaging the outer roll on the side opposite the bite of the rolls for preventing wrapping of the clothes around the outer roll.

4. In a washer, a tub, a vertical roll in the central part of the tub, projections thereon whereby rotation of the roll produces a circulatory movement of the clothes and liquid around the roll, a cooperating vertical roll within the outer part of the tub, and means for rotating the rolls whereby the clothes are fed between the bite of the rolls and circulated around the tub and around the central roll and back to the bite of the rolls.

5. In a washer, a tub, a vertical roll in the central part of the tub, a cooperating vertical roll within the outer part of the tub, and means for rotating the rolls whereby the clothes are fed between the bite of the rolls and circulated around the tub and back to the bite of the rolls, one of said rolls having a corrugated surface.

6. In a washer, a tub, a vertical roll in the central part of the tub, a cooperating vertical roll within the outer part of the tub, means holding the rolls in yielding contact, and means for rotating the rolls whereby the clothes are fed between the bite of the rolls and circulated around the tub and back to the bite of the rolls.

7. In a washer, a tub, a vertical roll in the central part of the tub, a cooperating vertical roll within the outer part of the tub, roll supporting means permitting relative movement of the rolls in torsional and radial directions, and means for rotating the rolls whereby the clothes are fed between the bite of the rolls and circulated around the tub and back to the bite of the rolls.

8. In a washer, a tub, a vertical roll in the central part of the tub, a cooperating vertical roll within the outer part of the tub, one of said rolls having a yielding surface and the other of said rolls having a rigid irregular surface, and means for rotating the rolls whereby the clothes are fed between the bite of the rolls and circulated around the tub and back to the bite of the rolls.

9. In a washer, a tub, a vertical roll in the outer part of the tub having an outer surface of yielding material, a cooperating vertical roll within the central part of the tub having a cooperating outer rigid surface, supporting means for the cooperating roll permitting yielding movement thereof in torsional and radial directions, and means for rotating the rolls whereby the clothes are fed between the bite of the rolls and circulated around the tub and back to the bite of the rolls.

10. In a washer, a tub, cooperating vertical rolls therein, means for rotating the rolls whereby clothes entering the bite of the rolls are fed through the rolls and for setting up a circulation of liquid in the tub in a path extending from the discharge side of the rolls around one of the rolls to the bite of the rolls whereby the clothes are circulated in said path.

CHARLES K. SKINNER.